(12) United States Patent
Breugelmans et al.

(10) Patent No.: US 12,393,027 B2
(45) Date of Patent: Aug. 19, 2025

(54) HEAD-MOUNTABLE DISPLAY APPARATUS AND METHODS

(71) Applicant: Sony Interactive Entertainment Inc., Tokyo (JP)

(72) Inventors: Mark Jacobus Breugelmans, London (GB); Maurizio Cerrato, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 533 days.

(21) Appl. No.: 17/721,008

(22) Filed: Apr. 14, 2022

(65) Prior Publication Data
US 2022/0350141 A1 Nov. 3, 2022

(30) Foreign Application Priority Data
Apr. 28, 2021 (GB) .................................. 2106067

(51) Int. Cl.
*G02B 27/01* (2006.01)
*G02B 7/12* (2021.01)
*G06F 3/01* (2006.01)

(52) U.S. Cl.
CPC .......... *G02B 27/0149* (2013.01); *G02B 7/12* (2013.01); *G02B 27/0172* (2013.01); *G06F 3/013* (2013.01); *G02B 2027/0159* (2013.01)

(58) Field of Classification Search
CPC ............ G02B 27/0149; G02B 27/0172; G02B 27/0176; G02B 27/0179
See application file for complete search history.

(56) References Cited

U.S. PATENT DOCUMENTS

| | | |
|---|---|---|
| 10,620,432 B1 | 4/2020 | Wheelwright |
| 10,962,777 B1 | 3/2021 | Wheelwright |
| 2010/0157433 A1 | 6/2010 | Mukawa |
| 2013/0083003 A1 | 4/2013 | Perez |
| 2014/0274391 A1 | 9/2014 | Stafford |
| 2016/0349521 A1 | 12/2016 | Zhao |
| 2018/0348860 A1 | 12/2018 | Lin |

FOREIGN PATENT DOCUMENTS

| | | |
|---|---|---|
| EP | 1731943 A | 2/2019 |
| WO | 2018158347 A1 | 9/2018 |

OTHER PUBLICATIONS

Combined Search and Examination report for corresponding GB Application No. GB2106067.8, 11 pages, dated Nov. 26, 2021.
Extended European Search Report for corresponding EP Application No. 22166963.3, 9 pages, dated Sep. 2, 2022.

*Primary Examiner* — Ryan D Howard
(74) *Attorney, Agent, or Firm* — Fish & Richardson P.C.

(57) ABSTRACT

A head mountable display apparatus includes a display unit to display one or more images to a user wearing the HMD, a first optical element and a second optical element each configured to direct light from the one or more images displayed by the display unit for viewing by a respective eye of the user, a first input unit to receive user information for the user indicative of a separation of the user's eyes, a second input unit to receive a user input, and an adjustment unit to adjust a current separation of the first and second optical elements responsive to the user input, where the display unit is configured to display a first image comprising one or more indicators indicative of the current separation of the first and second optical elements with respect to the separation of the user's eyes.

15 Claims, 10 Drawing Sheets

HEAD-MOUNTABLE DISPLAY APPARATUS AND METHODS

BACKGROUND OF THE INVENTION

Field of the Disclosure

The present disclosure relates to head-mountable displays, head-mountable display systems and methods. In particular, the present disclosure relates to apparatus and methods that configure a head mountable display (HMD) for a user wearing the HMD.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices. This type of HMD can position the actual display device in front of the user's eyes, in association with appropriately configured optical components for directing light from the display device towards the positions of the user's eyes for viewing images displayed by the display device. In this way, the user can view one or more images displayed by the display device via the configured optical components which focus light from the display device onto the user's respective eyes.

HMDs typically include a first optical component for directing the light from the display device towards a user's first eye and a second optical component for directing the light from the display device towards a second eye of the user, in which the two optical components have a predetermined arrangement within the HMD. However, a user's eye separation (e.g. a distance between the centres of the pupils, known as the interpupillary distance (IPD)) can vary greatly between different users. The predetermined configuration of the optical components may therefore be acceptable for some users of the HMD having an average IPD. However a significant number of users will experience visual discomfort due to the optical components not being correctly configured for the user's eye separation. For example, a misalignment of optical components with respect to the user's eyes can result in blurring of the images observed by the user and/or an incorrect perception of depth when viewing stereoscopic images, which can lead to eye strain. There is therefore a need to configure the optics of an HMD for the user wearing the HMD.

Various aspects and features of the present disclosure are defined in the appended claims and within the text of the accompanying description. Example embodiments include at least a head mountable display apparatus, a head mountable display system, a method of operating a head-mountable display apparatus as well as a computer program and a machine-readable, non-transitory storage medium which stores such a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
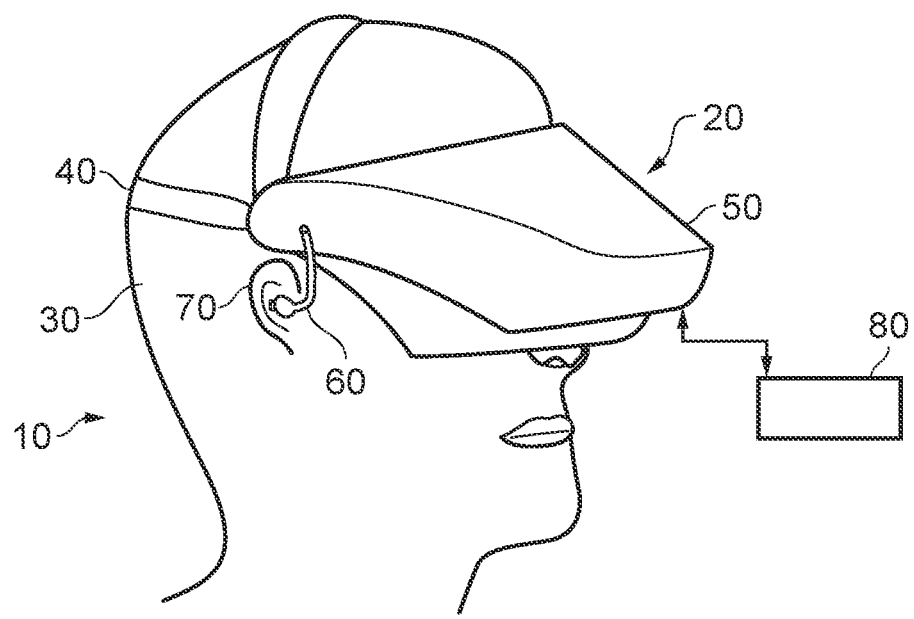
FIG. 1 schematically illustrates an HMD worn by a user.

Referring now to FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera optionally provided as part of the HMD may capture images to the front of the HMD, in use. Such images may be used for head tracking purposes, in some embodiments, while it may also be suitable for capturing images for an augmented reality (AR) style experience. A Bluetooth® antenna may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer or the PS5®), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
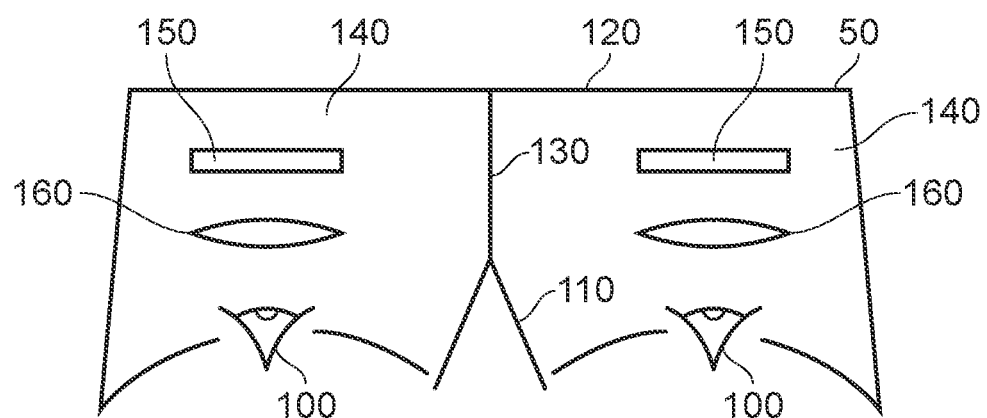
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
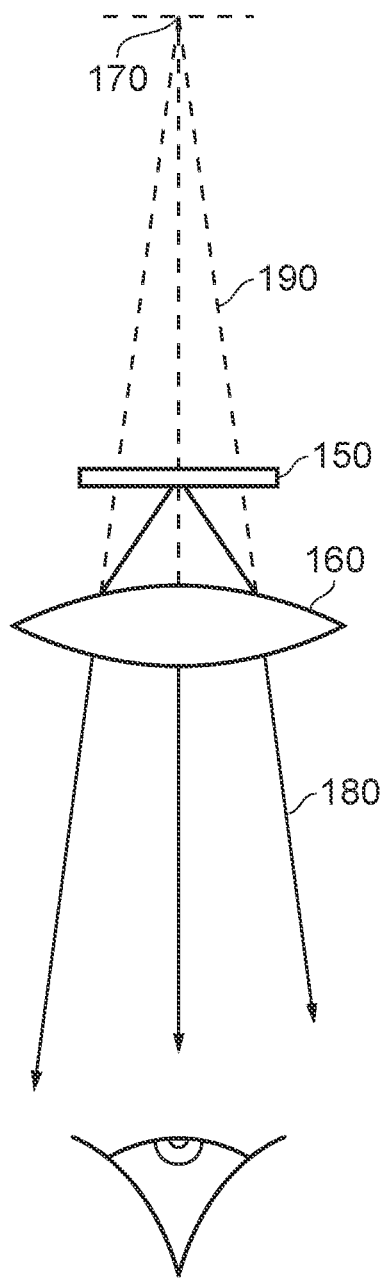
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
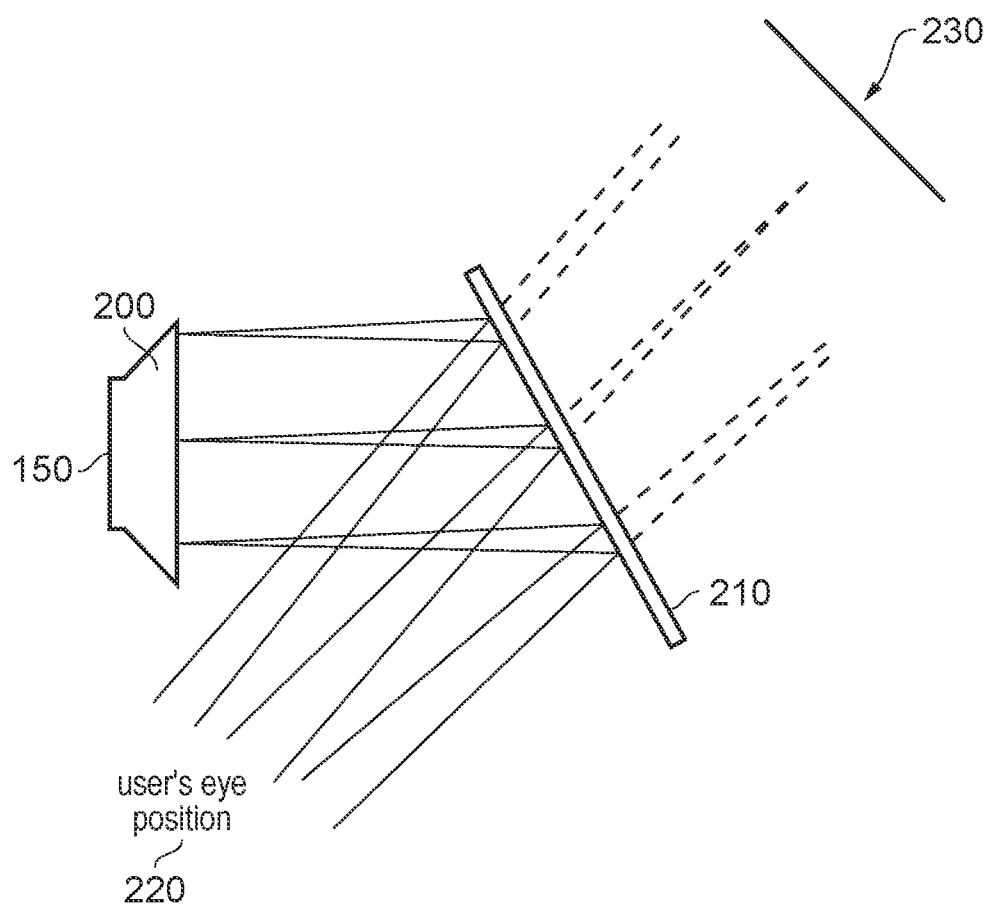
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located. This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

FIG. 6 schematically illustrates two possible arrangements for performing eye feature detection on an HMD, in which the results of the eye feature detection may be used for gaze tracking and/or eye separation measurement. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

Figure 6A:
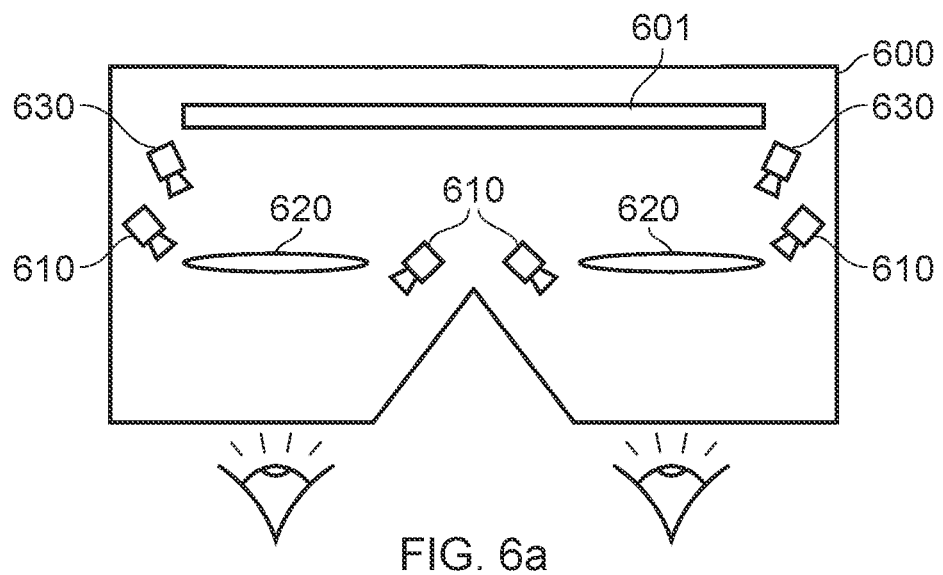
FIG. 6a schematically illustrates a plan view of an HMD.

FIG. 6a shows an example of a detector arrangement comprising one or more eye detectors each comprising an image sensor (e.g. one or more visible light cameras and/or one or more infra-red (IR) cameras). In the example shown, cameras are arranged within an HMD so as to capture images of the user's eyes from a short distance. This may be referred to as near-eye tracking, or head-mounted tracking. In some examples, a single camera may be positioned within the HMD to capture an image comprising both of the user's eyes or a respective camera may be used for each eye. As explained in more detail below, in embodiments of the disclosure a configuration of the optical elements 620 is adjustable by an adjustment unit provided as part of the HMD.

In this example, an HMD 600 (with a display unit/display element 601) is provided with cameras 610 that are each arranged so as to directly capture one or more images of a respective one of the user's eyes using an optical path that does not include the optical element 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However, it is considered that in some examples least some of the cameras can be arranged so as to include the optical element 620 in the image captured of the user's eye and/or to include the optical element the optical path used to capture the image of the eye. Examples of such positions in which the camera observes the eye via the optical element 620 are shown by the cameras 630 in FIG. 6*a*. While this may result in processing being required to enable suitably accurate tracking to be performed, due to the deformation in the captured image due to the optical element 620, this may be performed relatively simply due to the fixed positions of the cameras and the tracked position of the optical element 620 in a captured image. An advantage of including the optical element 610 within the optical path may be that of simplifying the physical constraints upon the design of an HMD, for example.

Alternatively or in addition, in some examples a first eye detector may be arranged to capture an image of the user's first eye (left or right eye) using an optical path that does not include the optical element 620 whilst also including at least a portion (e.g. an edge portion) of the optical element 620 within the captured image. In this way, the first eye detector can detect one or more features of the first eye and detect a position of the detected eye features whilst also detecting the optical element 620 and detecting a position of at least a portion of the optical element 620. Alternatively or in addition, a first eye detector can be arranged to detect an eye feature and another eye detector may be arranged solely to detect and track a position of the optical element 620. Hence more generally, in some examples the HMD comprises one or more eye detectors arranged to detect a position of a detected eye feature and a position of a portion of the optical element 620.

Figure 6B:
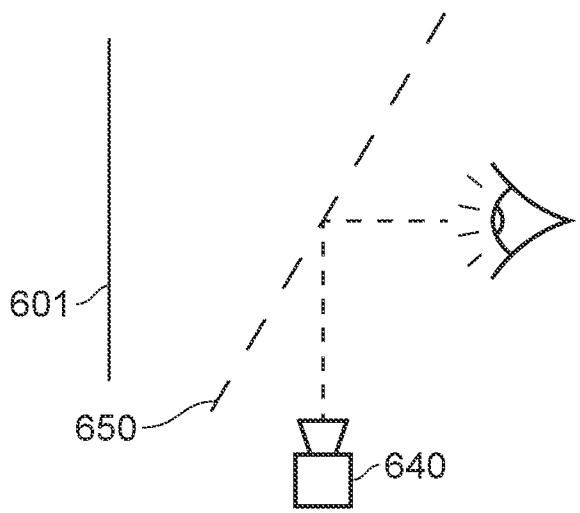
FIG. 6b schematically illustrates a near-eye tracking arrangement.

FIG. 6*b* shows another example of a detector arrangement in which eye detectors can be arranged so as to indirectly capture images of the user's eyes. Such an arrangement may be particularly suited to use with IR or otherwise non-visible light sources, as will be apparent from the below description.

FIG. 6*b* includes a mirror 650 arranged between a display unit/display element 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
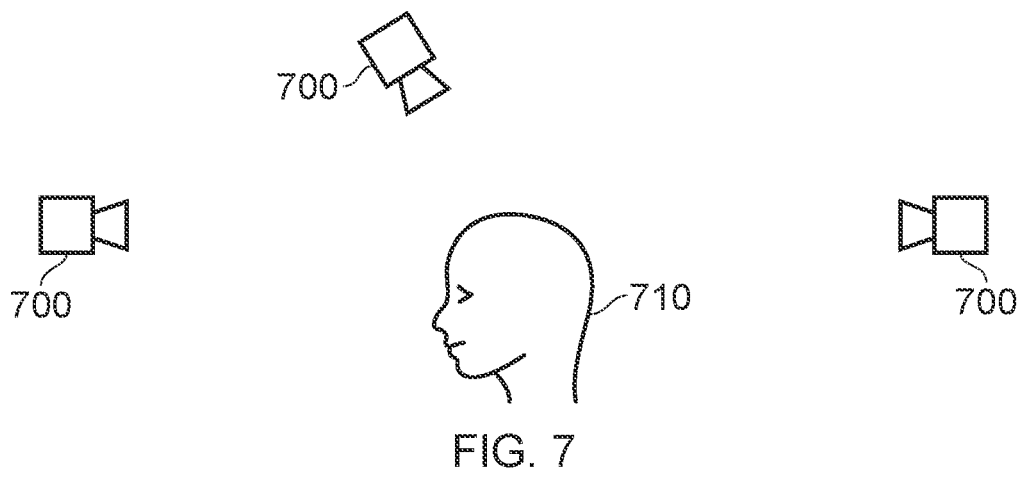
FIG. 7 schematically illustrates a remote tracking arrangement.

Of course, eye feature detection arrangements need not be implemented in a head-mounted or otherwise near-eye fashion as has been described above. For example, FIG. 7 schematically illustrates a system in which a camera is arranged to capture images of a user 710 from a distance when the user is not wearing an HMD; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

Figure 8:
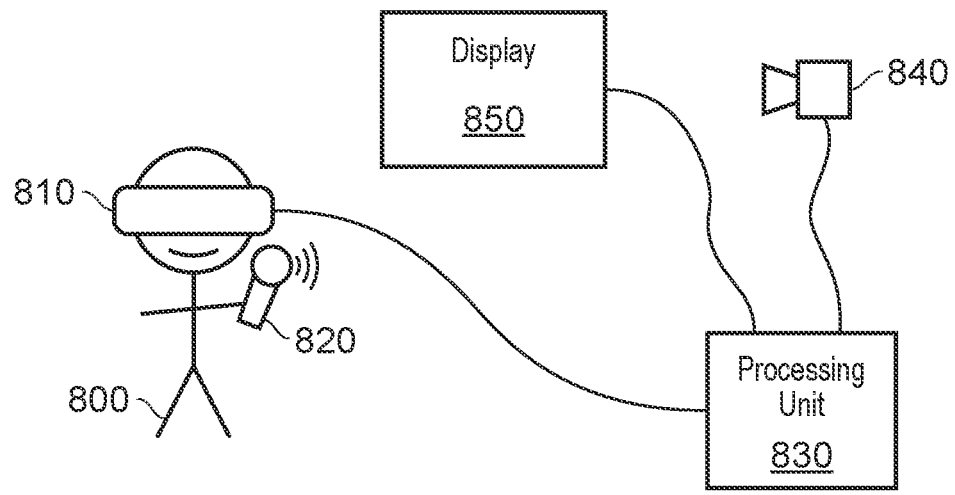
FIG. 8 schematically illustrates a gaze tracking environment.

FIG. 8 schematically illustrates an environment in which an eye feature detection process may be performed. In this example, the user 800 is using an HMD 810 that is associated with a processing unit 830, such as a games console (e.g. PS5®), with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

Figure 9:
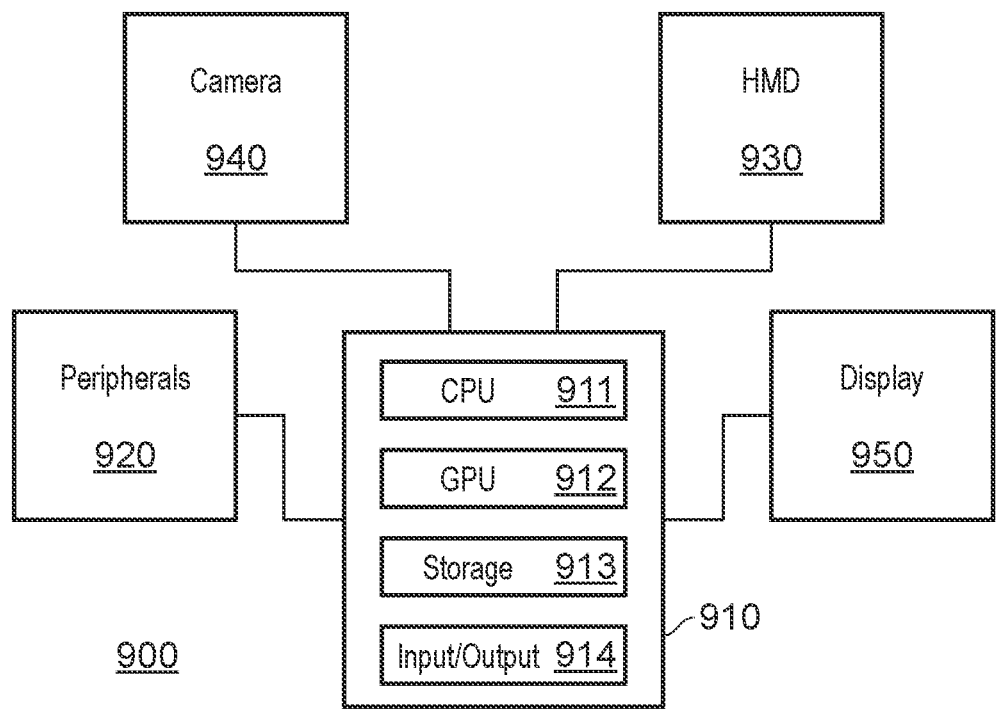
FIG. 9 schematically illustrates a gaze tracking system.

FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in accordance with observed changes in brightness.

It is more common to use standard cameras in such tracking arrangements, given that they are widely available and often relatively cheap to produce. 'Standard cameras' here refer to cameras which capture images of the environment at predetermined intervals which can be combined to generate video content. For example, a typical camera of this type may capture thirty images (frames) each second, and these images may be output to a processing unit for feature detection or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

However, in some arrangements it may be considered advantageous to instead use an event camera, which may also be referred to as a dynamic vision sensor. Such cameras do not require a shutter as described above, and instead each element of the light-sensitive array (often referred to as a pixel) is configured to output a signal at any time a threshold brightness change is observed. This means that images are not output in the traditional sense—however an image reconstruction algorithm may be applied that is able to generate an image from the signals output by an event camera.

While there is an increased computational complexity for generating an image from such data, the output of the event camera can be used for tracking without any image generation. One example of how this is performed is that of using an IR-sensitive event camera; when imaged using IR light, the pupil of the human eye displays a much higher level of brightness than the surrounding features. By selecting an appropriate threshold brightness, the motion of the pupil would be expected to trigger events (and corresponding outputs) at the sensor.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

Figure 10:
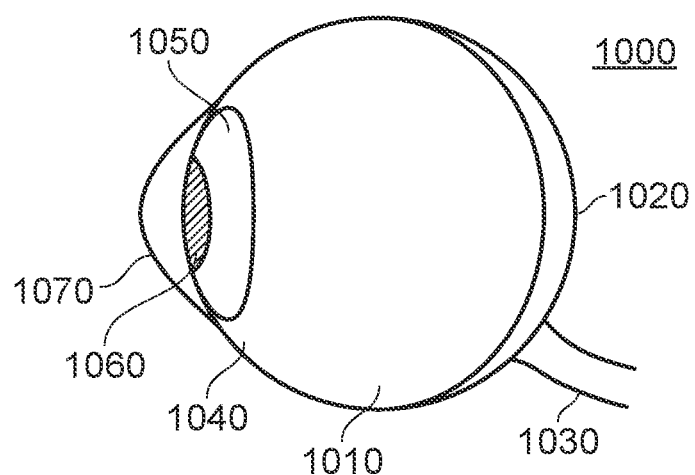
FIG. 10 schematically illustrates a human eye.

As suggested in the discussion above, the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

Figure 11:
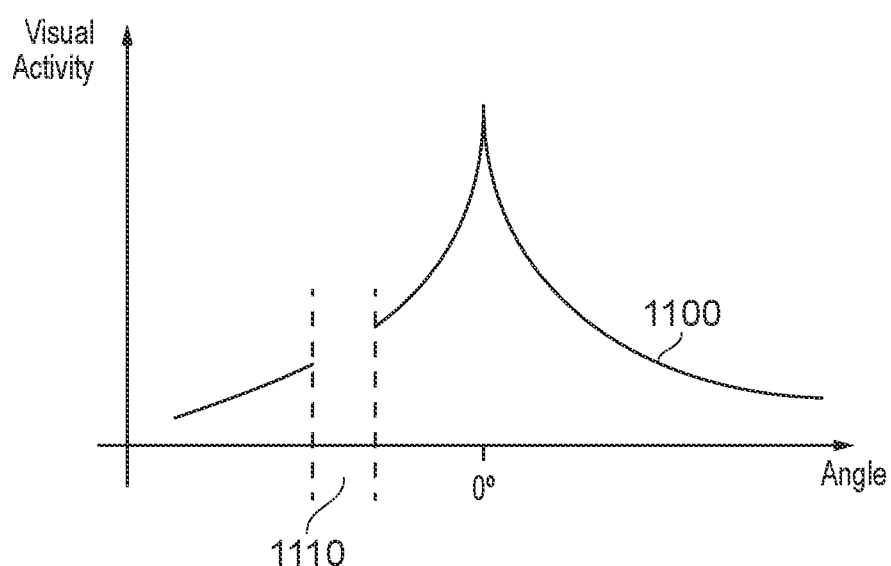
FIG. 11 schematically illustrates a graph of human visual acuity.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive colour or detail, and instead is used to detect motion.

As has been discussed above, foveal rendering is a rendering technique that takes advantage of the relatively small size (around 2.5 degrees) of the fovea and the sharp fall-off in acuity outside of that.

The eye undergoes a large amount of motion during viewing, and this motion may be categorised into one of a number of categories.

Saccades, and on a smaller scale micro-saccades, are identified as fast motions in which the eyes rapidly move between different points of focus (often in a jerky fashion). This may be considered as ballistic motion, in that once the movement has been initiated it cannot be altered. Saccades are often not conscious eye motions, and instead are performed reflexively to survey an environment. Saccades may last up to two hundred milliseconds, depending on the distance rotated by the eye, but may be as short as twenty milliseconds. The speed of a saccade is also dependent upon the total rotation angle; typical speeds may be between two hundred and five hundred degrees per second.

'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head.

Another type of motion is that of the vergence accommodation reflex. This is the motion that causes the eyes to rotate to converge at a point, and the corresponding adjustment of the lens within the eye to cause that point to come into focus.

Further eye motions that may be observed as a part of a gaze tracking process are those of blinks or winks, in which the eyelid covers the eyes of the user. Such motions may be reflexive or intentional, and can often interfere with eye tracking as they will obscure vision of the eye, and the eye is often not stationary during such a motion.

Different users may have different vision requirements. In particular, eye separation is a user-specific property that can vary significantly from one user to the next. Consequently, an HMD having a single predetermined setting of the HMD optics may be satisfactory for only a small number of users whilst the majority of users would benefit from a different setting of the optics.

The operations to be discussed below relate to an HMD including adjustable optical elements. In particular, the HMD includes at least two optical elements for directing light from a display unit towards a user's eyes and the configuration of the two optical elements is adjustable in response to a user input to allow the user to configure the optical elements according to their vision requirements. In addition, the operations to be discussed below relate to providing guidance to a user wearing an HMD when adjusting the configuration of the optical elements for assisting the user in correctly configuring the HMD.

Figures 12, 13A:
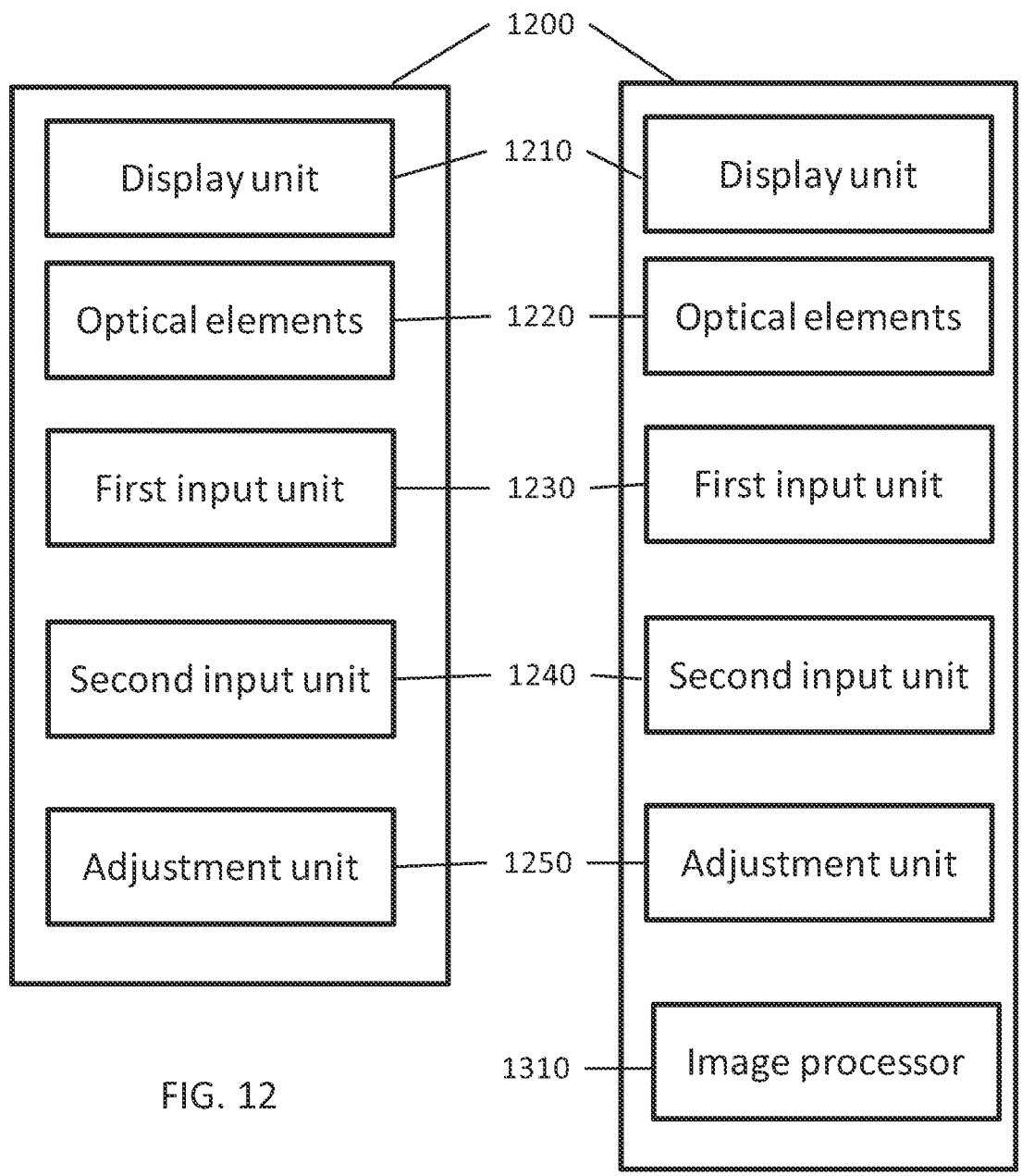
FIG. 12 schematically illustrates an HMD apparatus for configuring optical elements for a user's vision requirements.
FIG. 13a schematically illustrates another HMD apparatus comprising an image processor.

FIG. 12 schematically illustrates an HMD apparatus 1200 for configuring a first optical element and a second optical element responsive to a user input. In embodiments of the disclosure, the HMD apparatus 1200 comprises a display unit 1210 to display one or more images to a user wearing the HMD, a first optical element 1220a and a second optical element 1220b each configured to direct light from the one or more images displayed by the display unit for viewing by a respective eye of the user, a first input unit 1230 to receive user information for the user indicative of a separation of the user's eyes, a second input unit 1240 to receive a user input, and an adjustment unit 1250 to adjust a current separation of the first and second optical elements responsive to the user input, wherein the display unit 1210 is configured to display a first image comprising one or more indicators indicative of the current separation of the first and second optical elements with respect to the separation of the user's eyes as indicated by the user information.

The HMD apparatus 1200 comprises the display unit 1210 for displaying images to the user wearing the HMD 1200. The images can be generated by a processor provided as part of the HMD 1200. Alternatively, the processor for generating images for display by the display unit may be provided as part of a separate processing device (such as a personal computer or a games console) that communicates with the HMD 1200 via a wireless and/or wired communication. In some examples, the processing for generating the images for display by the display unit 1210 may be shared between a processor of the HMD 1200 and a processor of another device. The display unit 1210 is configured to display images and the references herein to images displayed by the display unit include two-dimensional images and three-dimensional images (also referred to as stereoscopic images including a left and right image pair).

The HMD apparatus 1200 comprises at least the first optical element 1220a and the second optical element 1220b, in which the first optical element 1220a is configured with respect to the display unit 1210 to direct light from the display unit 1210 for viewing by a first eye of the user and the second optical element 1220b is configured with respect to the display unit 1210 to direct light from the display unit 1210 for viewing by a second eye of the user. The first optical element 1220a and the second optical element 1220b may also be referred to herein as a right or left optical element. The first and second optical elements are arranged between the display unit 1210 and the user's face when the HMD is being worn by the user. The first and second optical elements are spaced apart from each other in a lateral direction, in which the positions of the first and second optical elements are adjustable by the adjustment unit 1250 to adjust the separation distance between the first and second optical elements. As explained previously, if the lateral separation of the optical elements is different to the user's eye separation, this can result in image blur and portrayed depths associated with stereoscopic content not appearing to be correct to the currently viewing user. In embodiments of the disclosure, at least the first position of the first optical element 1220a and the second position of the second optical elements 1220b are adjustable by the adjustment unit 1250 to vary the lateral separation of the first optical element 1220a and the second optical element 1220b. The user can provide the user input via the second input unit 1240 to thereby adjust the lateral separation of the two optical elements.

References herein to the separation distance between the first and second optical elements refer to a distance from a first point on the first optical element to a corresponding second point on the second optical element. For example, the separation distance may be the lateral distance from the centre of the first optical element to the centre of the second optical element, or from a rightmost edge or a leftmost edge of the first optical to a corresponding edge of the second optical element. Techniques for obtaining optical element separation information indicative of the separation distance for the first and second optical elements are discussed in more detail later. In some examples, the first and second optical elements may be provided with an optically detectable marker located at corresponding positions on the respective optical elements. The marker and/or an edge of either optical element 1220a, 1220b can be detected by an image-based sensor (such as an eye detector discussed previously with reference to FIG. 6) to detect a position of the optical element and optical element separation information can be obtained in dependence upon the detected positions of the two optical elements.

The first optical element 1220a comprises one or more first elements for directing light and the second optical element 1220b comprise one or more second elements for directing light. The elements for directing light may comprise lenses and/or mirrors. In embodiments of the disclosure, the first optical element 1220a comprises one or more first lenses and the second optical element 1220b comprises one or more second lenses. In some examples, the first optical element and the second optical element comprise one or more from the list consisting of: a Fresnel lens; a hybrid Fresnel lens; a convex lens; and a concave lens. It will be appreciated that other suitable types of lens are also considered and the first and second optical elements may comprise any suitable combination of lenses.

The HMD apparatus 1200 comprises the first input unit 1230 for receiving user information for the user wearing the HMD 1200, in which the user information is indicative of a separation of the user's eyes. In embodiments of the disclosure, the user information can be manually input by the user wearing the HMD, or the user information can be generated by an eye detector of the HMD 1200 that detects the user's eye separation, or the HMD 1200 may comprise storage circuitry to store the user information for one or more users such that user information for a given user can be retrieved from the storage circuitry. References herein to the user information indicative of the user's eye separation refer to information that is received by the HMD indicating a distance between two corresponding points on the user's respective eyes. The user's eye separation may be a distance from the centre of one pupil to the centre of the other pupil, known as the interpupillary distance (IPD). However, some detection techniques may involve detecting the user's iris and/or sclera and/or pupil and the user's eye separation may more generally be a distance from a feature of one eye to the corresponding feature of the other eye. Techniques for detecting a user's eye separation using one or more eye detectors are discussed in more detail later.

The user can manually enter a value of an eye separation (e.g. a value of a previously measured IPD for the user), for example using a controller device to enter the value, to thereby provide the user information. Therefore, the first input unit 1230 can receive user information corresponding to a value manually entered by the user. For example, as part of a calibration procedure, the HMD 1200 may display an image to request the wearing user to enter a value for their eye separation. Therefore, in a case where the user has either measured their own eye separation in advance (for example using a ruler) or has had their eye separation measured in advance by a trained professional, then the user can manually enter their eye separation for use by the HMD 1200 for configuring the optics of the HMD 1200 for the user.

Alternatively, the HMD 1200 may comprise storage circuitry to store one or more user profiles having associated user information. The HMD 1200 can receive the user information for a given user profile in response to a selection of the given user profile by a user. For example upon logging-in to a user profile the user information for that user profile may be received by the first input unit 1230. The user may have previously entered a value for their eye separation, as discussed above, and the entered value can be stored as part of the user information for that user's user profile.

Alternatively, the HMD 1200 may comprise one or more eye detectors, such as those described in relation to FIG. 6, for detecting the eye separation of the user wearing the HMD. The eye separation for a user can be detected using various detected features of the user's respective eyes including the sclera, iris and pupil. The one or more eye detectors can thus detect the eye separation for the user and generate the user information for the user, and the generated user information can be received by the first input unit 1230 for use when configuring the optics of the HMD 1200 for the user. This is discussed in more detail later.

It will therefore be appreciated that the first input unit 1230 can acquire the user information indicative of an eye separation for the user. The user information is used by the HMD 1200 to define a target separation for the optical elements that will result in the optical elements being correctly configured for the user.

The HMD apparatus 1200 comprises the second input unit 1240 for receiving a user input and the adjustment unit 1250 is configured to adjust a separation of the first and second optical elements 1220a, 1220b in accordance with the user input to allow the user to control the separation of the optical elements. In some embodiments, the adjustment unit 1250 for adjusting the configuration of the first and second optical elements 1220a, 1220b is mechanically coupled to the second input unit 1240 such that the user's physical manipulation of the second input unit causes a corresponding movement of the first and second optical elements to adjust the separation. In other embodiments, the adjustment unit 1250 is configured to communicate with the second input unit 1240 via a wired or wireless communication to receive one or more data signals in dependence upon the user input received by the second input unit 1240. Hence more generally, the second input unit 1240 is configured to receive a user input and the adjustment unit 1250 is configured to adjust the separation of the first and second optical elements 1220a, 1220b in dependence upon the user input received by the second input unit 1240.

In embodiments of the disclosure, the second input unit 1240 comprises a rotatable unit rotatable by a digit of a user's hand such that rotation of the rotatable unit causes an adjustment of the configuration of the first and second optical elements 1220a, 1220b due to the mechanical coupling of the rotatable unit and the adjustment unit 1250. The rotatable unit can be mechanically coupled to the adjustment unit 1250 using any known mechanism that converts the rotary motion of the rotatable unit to lateral motion of the first and second optical elements 1220a, 1220b so that rotation of the rotatable unit changes the lateral separation of the two optical elements. The rotatable unit is thus rotatable in first direction (clockwise or anticlockwise direction) to decrease a separation of the first and second optical elements 1220a, 1220b and is similarly rotatable in the opposite direction (anticlockwise or clockwise direction, respectively) to increase the separation of the first and second optical elements 1220a, 1220b. In this way, the user can manipulate the rotatable unit to adjust the separation of the optical elements.

In other embodiments of the disclosure, the second input unit 1240 may receive a user input and communicate one or more data signals to the adjustment unit 1250, via either a wired or wireless communication (e.g. Bluetooth®), for controlling an electric motor of the adjustment unit 1250 to adjust the separation of the first and second optical elements 1220a, 1220b. In this case, the adjustment unit 1240 may comprise one or more servo motors and/or one or more stepper motors for adjusting the positions of the first and second optical elements 1220a, 1220b in response to the one or more data signals received from the second input unit 1250. For example, the second input unit 1240 may comprise a plurality of tactile switches for receiving the user input and communicating one or more data signals accordingly. Alternatively, the second input unit 1240 may comprise a microphone configured to receive a sound input from the user so that the user can adjust the configuration of the first and second optical elements 1220a, 1220b using speech. In this way, the HMD 1200 allows hands-free control by the user of the configuration of the optical elements 1220a, 1220b. Alternatively or in addition, the HMD 1200 my optionally comprise one or more eye detectors (as mentioned previously and discussed in more detail later) and the second input unit 1240 can be configured to receive the user input in dependence upon a gaze direction detected by at least one of the eye detectors. Consequently, the use wearing the HMD 1200 can instruct the HMD 1200 to adjust the configuration of the first and second optical elements 1220a, 1220b using a gaze direction as the input.

In some examples, the adjustment unit 1250 is configured to simultaneously adjust the positions of first and second optical elements 1220 in dependence upon the user input received by the second input unit 1250. In this case, the user input received by the second input unit 1240 causes simultaneous movement of both the first and second optical elements 1220 to change the separation distance. The first optical element and second optical element are preferably arranged within the HMD symmetrically about a given point positioned opposite a central portion of the display unit so that movement of the first optical element 1220a in a lateral direction towards or away from the centre point by a given distance is accompanied by movement of the second optical element 1220b in the lateral direction towards or away from the centre point by the same given distance. It is generally assumed that the user's face will be substantially symmetrical with respect to the centre point.

For example, the second input unit 1240 may consist of a rotatable unit such that rotation of the rotatable unit in one direction (e.g. clockwise) simultaneously adjusts a position of both the first and second optical element to decrease the lateral separation of the optical elements, and rotation of the rotatable unit in the other direction (e.g. anti-clockwise) simultaneously adjusts the position of both the first and second optical element to increase the lateral separation of the optical elements. Similarly, the HMD 1200 may comprise two or more tactile switches each configured to communicate one or more data signals to the adjustment unit 1250 depending on whether the switch is in a pressed state, in which the adjustment unit 1250 comprises one or more electric motors for simultaneously moving the first and second optical elements to adjust the separation distance. The user may press a first tactile switch to simultaneously move the two optical elements towards each other and may instead press a second tactile switch to simultaneously move the two optical elements away from each other. Similarly, the HMD 1200 may comprise a microphone configured to receive a first sound for decreasing the separation distance of the two optical elements and a second sound for increasing the separation distance of the two optical elements.

In other examples, the adjustment unit 1250 is configured to adjust the positions of first and second optical elements 1220 independently of each other. The HMD 1200 may comprise one second input unit 1240 for receiving a first user input for adjusting the position of the first optical element 1220a and another second input unit 1240 for receiving a second user input for adjusting the position of the second optical element 1240. For example, a first rotatable unit may be provided for adjusting the position of the first optical element 1220a and a second rotatable unit may be provided for adjusting the position of the second optical element 1220b. In this way, the positions of the first and second optical elements 1220a, 1220b can be adjusted independently of each other. Similarly, a first set of tactile switches may be provided for adjusting the first optical element (e.g. two switches disposed on one side of the HMD for allowing the user to move the optical element either in an inwards direction towards the user's nose or in an outwards direction towards the user's temple) and a second set of tactile switches may be provided for adjusting the second optical element. Similarly, the HMD 1200 may comprise a microphone such that a speech input from the user can specify which of the optical elements to move and a direction of movement (towards the other optical element or away from the other optical element). A first electric motor can be provided for moving the first optical element and a second electric motor can be provided for moving the second optical element so that the motors can be respectively controlled.

The display unit 1210 is configured to display a first image comprising one or more indicators indicative of the current separation of the first and second optical elements with respect to the separation of the user's eyes indicated by the user information. The first image is generated for display by the display unit 1210 in dependence upon both the user information received by the second input circuitry 1240 and the current separation of the first and second optical elements. The one or more visual indicators included in the image provide the user with visual guidance during adjustment of the optical elements via the second user input unit 1240 by informing the user of a relationship between the user's eye separation indicated by the user information and the current separation of the optical elements. Therefore, whilst the user changes the separation of the optical elements via the second input unit 1240 and the adjustment unit 1250, one or more of the visual indicators can be updated to assist the user in changing the separation of the optical elements to more closely match the user's eye separation. In some cases a single graphical indicator (visual indicator) may be included in the first image to indicate to the user whether to increase or decrease the current separation of the optical elements 1220a, 1220b. In other cases, a plurality of graphical indicators may be displayed for providing the user with further guidance. This is discussed in more detail later.

As explained previously with reference to FIG. 6, the HMD 1200 may comprise one or more eye detectors to detect features of the user's eyes and one or more of the eye detectors may also detect a position of the optical element with respect to the predetermined position of the eye detector. As such, an eye detector can be configured to generate optical element position information indicative of a detected position of an optical element. The optical element position information can be generated for both the first and second optical elements and is indicative of a separation of the two optical elements. Therefore, the first image can be generated for display in dependence upon the user information for the user and the optical element position information to thereby include one or more indicators indicative of the current separation of the first and second optical elements with respect to the separation of the user's eyes. Adjustment of the separation of the optical elements by the adjustment unit 1250 can be monitored by one or more of the eye detectors arranged in the HMD 1200 and the first image can be updated accordingly to provide the user with feedback during the adjustment.

Alternatively or in addition, at least one of the adjustment unit 1250 and the second input unit 1240 may comprise one or more sensors for detecting at least one of an absolute position or a relative position or a number of rotations of a mechanical shaft (e.g. one or more of a capacitive displacement sensor, a potentiometer sensor and an optical proximity sensor). The one or more sensors can be configured to detect a displacement of a component of the second input unit 1240 and/or the adjustment unit 1250 with respect to a reference position. Using a predetermined relationship between a displacement of a component with respect to the reference position and a change of the separation of the first and second optical elements 1220a, 1220b, the detected displacement can be used to calculate a current separation of the first and second optical elements 1220a, 1220b. For example, the second input unit 1240 may comprise a rotatable unit comprising a potentiometer or other similar sensor, and a detection of a given number of rotations of the rotatable unit can be mapped to a given change in the separation of the optical elements using a predetermined relationship. Alternatively or in addition, a sensor directly measuring a separation distance between predetermined parts of the respective optical elements may be used, for example using a linear potentiometer mechanically coupled between the optical elements whose output changes as the distance between the optical element changes. Hence more generally, the HMD 1200 may comprise one or more position sensors configured to derive a current separation of the first and second optical elements 1220a, 1220b in dependence upon a detected displacement of a component of the adjustment unit 1250 and/or the second input unit 1240. As such, the first image can be generated for display in dependence upon the user information for the user and the derived current separation of the first and second optical elements.

Alternatively or in addition, for the case in which the adjustment unit 1250 comprises one or more electric motors controlled in response to the one or more data signals transmitted by the second input unit 1240, the adjustment unit 1250 may be provided with circuitry to generate the optical element position information for the first and second optical elements 1220a, 1220b in dependence upon one or more control parameters for the electric motor. For example, the circuitry can be configured to generate the optical element position information in dependence upon a number of discrete steps by a stepper motor and a relationship between a change of the separation of the first and second optical elements 1220a, 1220b associated with a discrete step (e.g. if each step by the motor increases or decreases the separation distance by 1 mm, then 5 discrete steps in a same direction corresponds to a decrease or increase of the separation distance by 5 mm).

Hence more generally, the current separation of the first and second optical elements 1220a, 1220b can be obtained by directly detecting the positions of the optical elements using captured images and/or by deriving the positions of the optical elements using one or more sensors associated with the second input unit 1240 and/or the adjustment unit 1250.

The display unit 1210 therefore displays the first image to provide an indication of the current separation of the first and second optical elements relative to the separation of the user's eyes as indicated by the user information, so that the user can view the first image for assistance to correctly configure the first and second optical elements using the second input unit 1240. In particular, the user can view the first image whilst also providing the user input to the second input unit 1240 so that the first image provides the user with feedback regarding the current separation of the first and second optical elements relative to the target separation specified by the user information received for the user.

Therefore, rather than the user adjusting the separation of the optical elements and relying on a subjective assessment of whether the user considers the first image to have a sharp appearance for both eyes, the HMD 1200 can advantageously display the one or more indicators to quickly and reliably guide the user through the adjustment process to correctly align the optical elements for the user's vision requirements. Moreover, it is still common for a group of users, such as a family or household, to share the use of one or more HMDs. By guiding the user through the adjustment process using the first image, the HMD can be quickly configured for the user's eye separation thereby facilitating use of an HMD by a large group of users.

As explained previously, the processing for generating the first image may be performed by the HMD or by another processing device or a combination of the two devices. The image processor for generating the first image receives the user information and information indicative of the current separation of the first and second optical elements and generates the first image accordingly. Therefore, the first image is updated by the image processor responsive to the adjustment of the current separation of the first and second optical elements by the user to provide the user with visual feedback.

FIG. 13a schematically illustrates the head mountable display 1200 comprising the image processor 1310 for generating the one or more images for display by the display unit, including the first image.

Figure 13B:
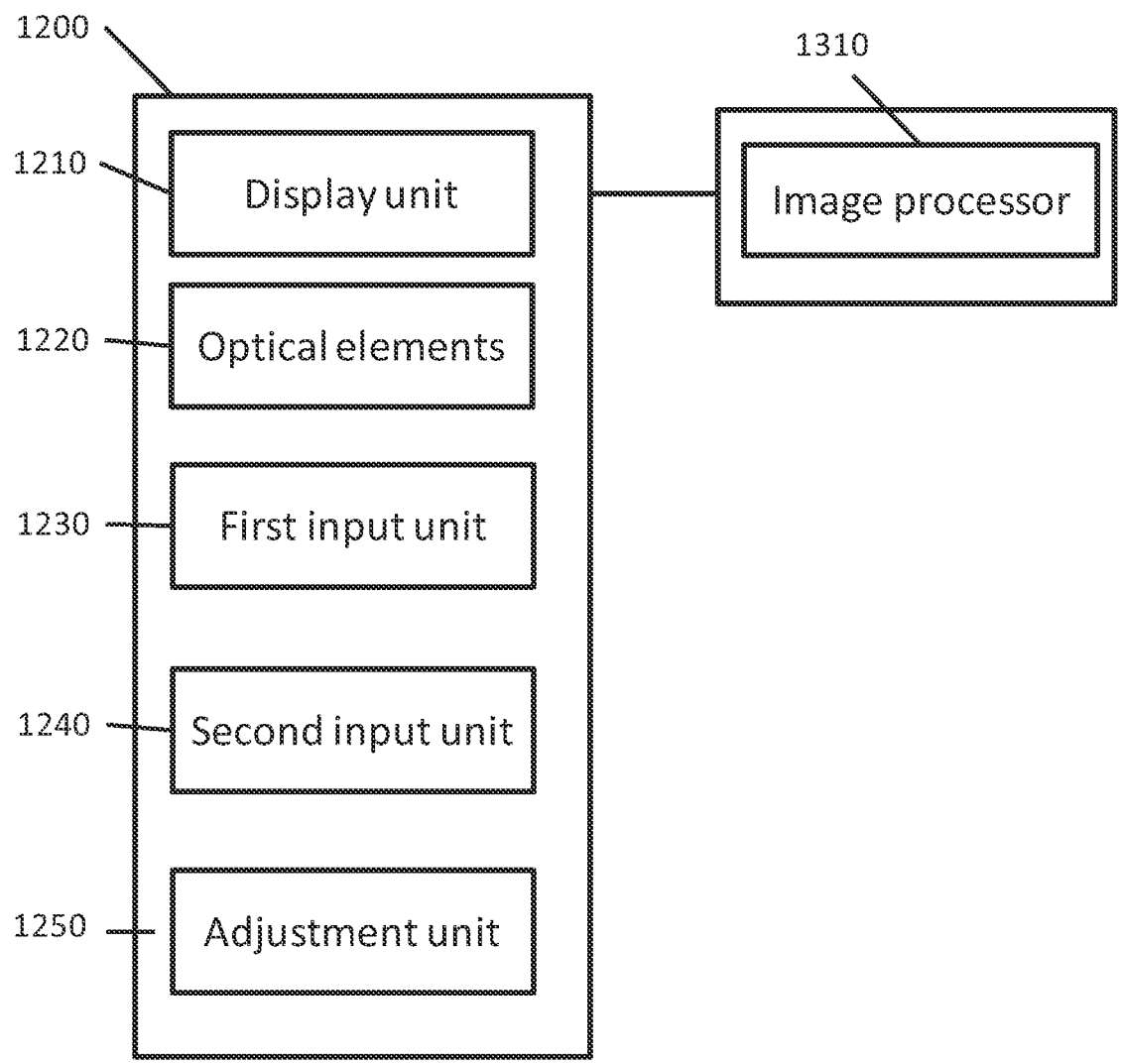
FIG. 13b schematically illustrates an HMD system comprising an HMD and an information processing device comprising an image processor.

FIG. 13b schematically illustrates a head mountable display system 1300, comprising the HMD 1200 and an image processor 1310 provided as part of another processing device. The image processor 1310 is provided separate to the HMD 1200 and communicates with the HMD 1200 via a wired or wireless communication. Whilst the image processor is schematically shown in FIG. 13b as being connected to the HMD 1200 via a solid line, the solid line is used to represent a wired or wireless communication.

In embodiments of the disclosure, the image processor 1310 is configured to generate one or more images for display by the display unit 1210 in dependence upon the user information for the user indicative of the separation of the user's eyes. Changes in the positions of the optical elements 1220a, 1220b and the positions of the user's eyes with respect to the display unit 1210 can vary a location and a size of a portion of the display unit 1210 from which light is focused onto the user's retina. In particular, the image processor 1310 may be configured to generate images for display by the display unit 1210 to deliberately include a distortion (e.g. barrel distortion) that is opposite to that introduced by a lens of the HMD so that the user observes an undistorted image via the lens. Therefore, the user can be guided to correctly configure the optical elements 1220a, 1220b by viewing the first image, and subsequently one or more images for a content (such a s video game or a film) can be generated for display by the display unit 1210 in dependence upon the geometric relationship of the user's eyes with respect to the display unit as indicated by the user information. In particular, the image processor 1310 can be configured to generate a stereoscopic image for display by the display unit 1210 and the image processor 1310 is operable to generate the stereoscopic image with an image parallax in dependence upon the user's eye separation. In this way, stereoscopic content can be accurately displayed to the user to account for the respective positions of the two eyes.

In embodiments of the disclosure, the first image comprises at least one indicator indicative of whether a difference between the current separation of the first and second optical elements and the separation of the user's eyes indicated by the user information is greater than a threshold distance. The image processor 1310 can generate the first image to include at least one graphical indicator according to the user information for the user and the current separation of the optical elements 1220a, 1220b to indicate to the user whether the current separation of the first optical element 1220a from the second optical element 1220b is smaller than or greater than the indicated separation of the user's two eyes (as indicated by the user information received by the first input unit 1230) by more than a threshold distance. A first value A1 for the separation distance of the two optical elements can be compared with a second value A2 for the separation distance of the user's eyes and a difference between the two values A1 and A2 can be compared with a value A3 of the threshold distance so that the graphical indicator is displayed to indicate whether the difference between A1 and A2 is greater than the value A3. The following condition may be used: if ($|A1-A2|>A3$) then the difference is greater than threshold distance and the graphical indicator indicates that adjustment of the optical elements should be performed by the user. In addition, when the difference is less than or equal to the threshold distance (if ($|A1-A2|\leq A3$)) then the graphical indicator may either be removed from the first image (so that the omission of the graphical indicator indicates that no further adjustment is needed by the user) or the graphical indicator may visually indicate that the difference is less than or equal to the threshold distance and no further adjustment is required from the user. It will be appreciated that a value for the threshold separation distance may be freely set in advance by an HMD designer or by a user wearing the HMD.

A value for the threshold distance A3 may be programmed for the HMD in advance or in some cases the user may be able to select a value for the threshold distance from a plurality of predetermined values so that the user can decide how accurate the alignment of the optical element needs to be. In some examples, the threshold separation distance A3 may be set in advance to have a value in the range 0.1 mm-10 mm. In other examples, the user may select a value from a plurality of predetermined values. For example, the HMD may display an image including a list of possible values such as 0.5 mm, 1 mm, 1.5 mm, 2 mm, 2.5 mm, 3 mm, 3.5 mm and 4 mm for selection by the user, and a user selection of one of the values can be used to select the value for the threshold distance. In other examples, the user may provide an absolute value (in units of distance, e.g. micrometres, millimetres or centimetres) for setting the value for the threshold distance. Therefore, for applications requiring a high degree of accuracy for the alignment of the user's eyes with respect to the optics of the HMD, a smaller value can be used for the threshold distance to assist the user in achieving an alignment with a high degree of accuracy. Conversely, for applications which do not necessarily require a high degree of accuracy for the alignment of the user's eyes with respect to the optics of the HMD (e.g. a relatively short video game for which the appeal may lie in being quick and simple and for which a user does not wish to perform a long alignment procedure) then a larger value can be used for the threshold distance to assist the user in quickly achieving a satisfactory alignment.

Therefore, the first image can be generated to include at least one graphical indicator to inform the user of whether the current separation of the first and second optical elements set by the adjustment unit 1250 satisfies a threshold condition. For example, if the user information indicates an eye separation for the user corresponding to an IPD of 63 mm and a threshold distance of 2 mm is set, then the first image can be displayed to the user to include at least one graphical indicator to indicate to the user whether the separation distance from a centre of the first optical element 1220a to a centre of the second optical element 1220b is greater than 65 mm or less than 61 mm so that the user can be guided to adjust the separation distance for the optical elements 1220a, 1220b via the second input unit 1240 to achieve a separation distance in the range 65 mm to 61 mm while viewing the first image.

In embodiments of the disclosure, the first image comprises at least one indicator indicative of whether the current separation of the first and second optical elements is greater or smaller than the separation of the user's eyes. The image processor 1310 can generate the first image to include at least one graphical indicator according to the user information for the user and the current separation of the optical elements 1220a, 1220b to indicate to the user the current separation of the first and second optical elements with respect to the separation of the user's eyes (as indicated by the user information) by indicating that the current separation exceeds the user's eye separation value or that the current separation is smaller than the user's eye separation value. In this way, by viewing the at least on indicator, the user can be informed of whether to increase or decrease the current separation of the first and second optical elements. In other words, the user can make an informed decision, by viewing the first image and the associated indicator, of a direction (increase of decrease of separation) in which to change the separation of the optical elements. This is particularly beneficial in the case in which the second input unit 1240 comprises a rotatable unit that is mechanically coupled to the adjustment unit 1250 in that the user can be informed of a direction (clockwise or anti clockwise) in which to rotate the rotatable unit to quickly align the optics for the user's vision requirements specified by the user information.

In some examples, a first graphical indicator in the first image is indicative of whether the difference between the current separation of the first and second optical elements and the separation of the user's eyes is greater than a threshold distance, and a second graphical indicator in the first image is indicative of whether the current separation of the first and second optical elements is greater or smaller than the separation of the user's eyes. For example, the first graphical indicator may take the form of an icon having a first colour (e.g. red) when the difference is greater than the threshold distance and having a second colour (e.g. green) different from the first colour when the difference is less than or equal to the threshold distance. The second graphical indicator may take the form of an icon for indicating at least a first direction and a second direction, such as an arrow icon having two or more possible orientations within the first image. The second graphical indicator may have a first orientation when the current separation of the first and second optical elements is greater than the separation of the user's eyes and a second orientation different from the first orientation when the current separation of the first and second optical elements is smaller than the separation of the user's eyes. In this way, the orientation of the second graphical indicator can inform the user of a direction of change in order for the current separation of the first and second optical elements to be changed to more closely match the indicated eye separation for the user's eyes.

In other examples, a single graphical indicator in the first image is indicative of whether the difference between the current separation of the first and second optical elements and the separation of the user's eyes is greater than a threshold distance and also indicative of whether the current separation of the first and second optical elements is greater or smaller than the separation of the user's eyes. For example, the graphical indicator may take the form of an icon for indicating at least a first direction and a second direction, as discussed above, and the icon may also have a first colour or a second colour in dependence upon whether the difference between the current separation of the first and second optical elements and the separation of the user's eyes is greater than the threshold distance.

Figure 14:
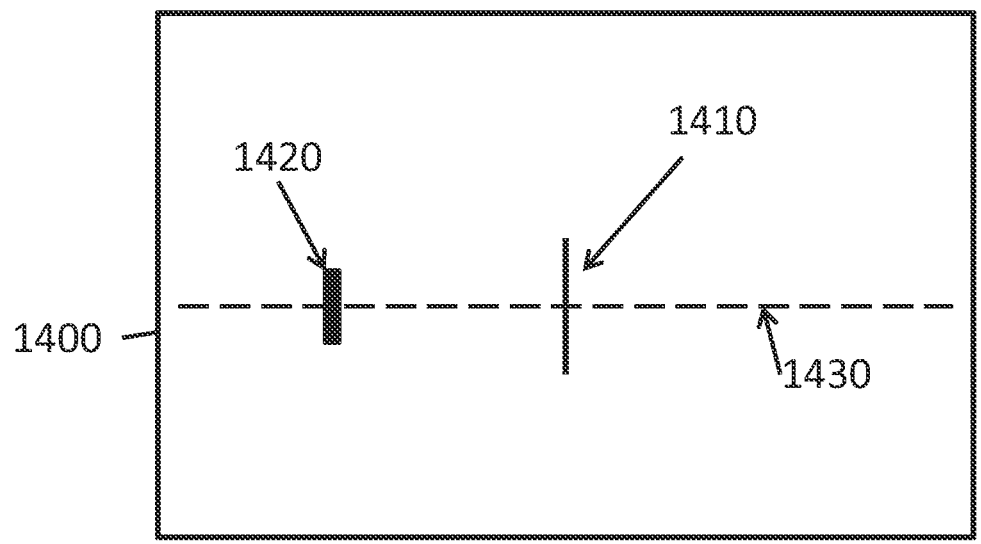
FIG. 14 schematically illustrates an image displayed by an HMD for providing guidance to a user when adjusting an optical element configuration.

In some examples, the first image comprises a plurality of indicators in which a first indicator is arranged with respect to a second indicator to indicate the current separation distance of the first and second optical elements with respect to the separation distance of the user's eyes. FIG. 14 schematically illustrates an example of the first image 1400 comprising a first indicator 1410 and a second indicator 1420, in which the distance in the first image between the first indicator 1410 and the second indicator 1420 is indicative of the current separation of the first and second optical elements with respect to the separation of the user's eyes. In the example shown, the first indicator 1410 has a position that remains fixed in the first image 1400 (preferably fixed at a position corresponding to the centre of the first image) and the second indicator 1420 has a position in the first image 1400 that is updated in response to changes in the separation of the first and second optical elements 1220a, 1220b. Therefore, the user can provide the user input to the second input unit 1240 to thereby adjust the current separation distance of the first and second optical elements whilst viewing the first image 1400, and changes in the current separation distance are reflected in a change in the position of the second indicator 1420 with respect to the first indicator 1410 such that the second indicator 1420 either moves towards or moves away from the first indicator 1410. Therefore, the first indicator 1410 serves as a target and the user aims to provide the user input to move the second indicator 1420 towards, and to preferably coincide with, the position of the first indicator 1410. Hence more generally, the distance between the first indicator 1410 and the second indicator 1420 is indicative of a difference between the current separation of the first and second optical elements and the separation of the user's eyes. The image processor 1310 can be configured to use predetermined relationship to generate the first image so that a difference of X mm between the optical element separation and the user's eye separation corresponds to a distance of Y mm between the first indicator 1410 and the second indicator 1420, where the value Y is obtained by multiplying the value X by a constant value N. A value of N that is greater than 1 can thus be used to generate the first image 1400 for display in which a small difference between the optical element separation and the user's eye separation can be visually represented to the user using the first and second indicators in a manner that provides the user with visual feedback so as to allow the user to easily align the optical elements for the user's requirements.

In embodiments of the disclosure, the first image comprises at least one indicator indicative of a magnitude of a difference between the current separation of the first and second optical elements and the separation of the user's eyes. The image processor 1310 is operable to generate the first image to include at least one graphical indicator according to the user information for the user and the current separation of the optical elements 1220a, 1220b to indicate to the user an extent to which the optical element separation differs from the user's eye separation. In a simplest case, the at least one indicator may take the form of a number without units ranging from a first value to a second value, and a magnitude of the number is indicative of the magnitude of the difference between the current separation of the first and second optical elements and the separation of the user's eyes. For example, a number in the range −10 to +10 (or −1 to 1) may be used, in which 10 is indicative of a large difference and 5 is indicative of a smaller difference, and a positive number indicates that the optical element separation is greater than the user's eye separation while a negative number indicates that the optical element separation is smaller than the user's eye separation, or vice versa. In this case, the user can view the at least one indicator and aim to provide the user input via the second input unit 1240 with the aim of adjusting the magnitude of the displayed number to correspond to a target number (e.g. zero).

Alternatively, the image processor 1310 can be configured to generate the first image to include at least one graphical indicator comprising a value having units of distance for the difference between the optical element separation and the user's eye separation. Using the user information for the user and the optical element separation, the first image can be generated to include a value having units of distance (e.g. micrometres, millimetres, centimetres) by subtracting the optical element separation from the user's eye separation, or vice versa. As such, a value having units of distance can be displayed, in which the value is either negative or positive depending on whether the optical element separation is greater than the user's eye separation, and the user can view the first image and provide the user input to the second input unit 1240 with the aim of adjusting the positive or negative value towards zero. In some examples, the image processor 1310 can be configured to generate the first image to include at least one graphical indicator comprising an absolute value having units of distance for the difference between the optical element separation and the user's eye separation. In this way, the user is only informed of the absolute difference and aims to adjust the absolute value towards zero (aims to minimise the displayed value).

In some examples, the first image 1400 may optionally comprise an axis 1430 as shown in FIG. 14 and the axis may include labelled divisions having units of distance. In this way, alternatively or in addition to displaying a value to indicate the magnitude of the difference between the current separation of the first and second optical elements and the separation of the user's eyes, the first indicator 1410, second indicator 1420 and axis 1430 can be displayed as shown in FIG. 14 to indicate the magnitude of the difference.

In embodiments of the disclosure, the magnitude of the difference between the current separation of the first and second optical elements and the separation of the user's eyes is indicated in predetermined units associated with the second input unit 1240. The image processor 1310 can generate the first image to include at least one indicator for indicating the difference in dependence upon one or more properties associated with second input unit 1240. In some examples, the second input unit 1240 may comprise a mechanism such as a rotatable unit (e.g. a rotatable knob) that is mechanically coupled to the adjustment unit 1250 so that rotation of the rotatable unit changes the separation distance for the first and second optical elements. Alternatively, the second input unit 1240 may comprise a mechanism such as first and second tactile buttons (also referred to as tactile switches) connected to the adjustment unit 1250 via a wired connection for communicating data signals to the adjustment unit 1250 for adjusting the separation of the first and second optical elements. By firstly calculating the magnitude of the difference between the current separation of the first and second optical elements and the separation of the user's eyes in units of distance and then using a predetermined relationship for the second input unit 1240 defining a predetermined distance for a given manipulation of the second input unit 1240, the calculated distance can be converted from units of distance to a predetermined unit associated with the second input unit 1240. For example, for a tactile button the predetermined relationship may define a change in the separation of the optical elements of Z mm for a single press of the tactile button. As such, the first image can be generated to display a number of presses of the tactile button required either for the optical element separation to substantially correspond to the user's eye separation or for the difference between the optical element separation and the user's eye separation to be less than or equal to a threshold distance (as discussed above).

In embodiments of the disclosure, the second input unit 1240 comprises a rotatable unit coupled to the adjustment unit 1250 and the magnitude of the difference between the current separation of the first and second optical elements and the separation of the user's eyes is indicated in units of rotation of the rotatable unit. A rotatable unit, such as a rotatable knob (adjustment knob), can be provided on the HMD 1200 at a position that is accessible by a user's hand, such as to the rear of the HMD 1200 or at either side of the HMD 1200 or proximate to the temple portion of the HMD 1200. The user can thus manipulate the rotatable unit whilst viewing the first image displayed by the HMD 1200. A predetermined relationship for the rotatable unit defining a correspondence between a degree of rotation of the rotatable unit and a corresponding change in the separation distance for the first and second optical elements can be used to convert a value in units of distance to an angle of rotation of the rotatable unit. As such, the first image can be generated to include an indicator indicating a degree of rotation of the rotatable under and/or a number of rotations of the rotatable unit either for the optical element separation to substantially correspond to the user's eye separation or for the difference between the optical element separation and the user's eye separation to be less than or equal to a threshold distance (as discussed above). For example, the first image may indicate to the user that 0.75 rotations of the rotatable unit are required in order to align the optics for the difference between the user's eye separation and the current separation distance for the optical elements.

Figure 15:
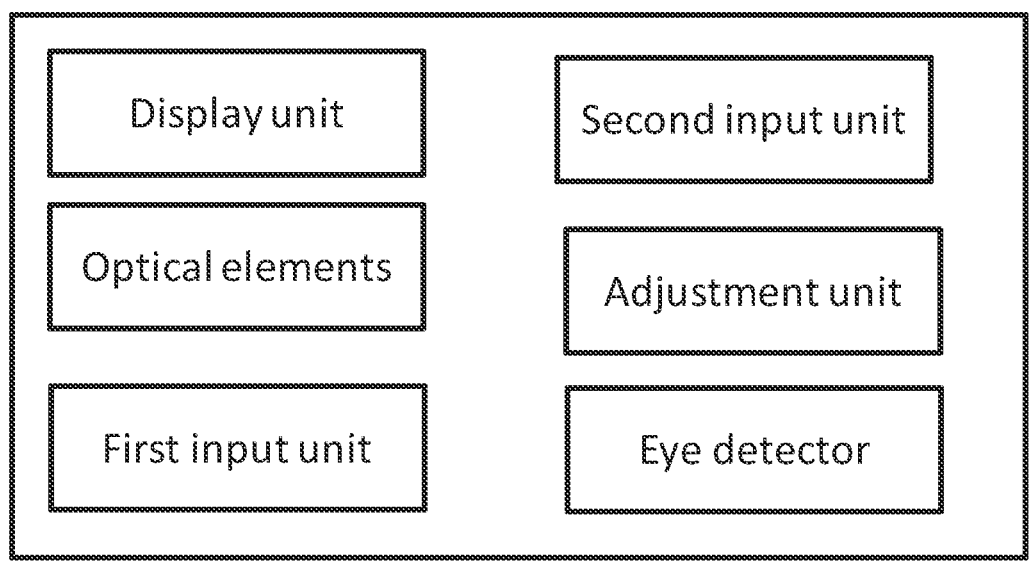
FIG. 15 schematically illustrates an HMD comprising one or more eye detectors for detecting eye separation.

Referring now to FIG. 15, in embodiments of the disclosure the HMD 1200 comprises at least one eye detector 1510 configured to detect the separation of the user's eyes and generate the user information for the user. The first input unit 1230 can therefore receive the user information generated by the at least one eye detector, in which the user information comprises a detected eye separation for the user wearing the HMD 1200. The HMD 1200 may comprise one or more eye detectors arranged as discussed previously with reference to FIG. 6a. In a simplest case, a single eye detector can be positioned inside the HMD to capture one or more images including both of the user's eyes. Alternatively, a first eye detector can be arranged to capture one or more images including one of the user's eyes and a second eye detector can be arranged to capture one or more images including the other of the user's eyes. In some examples which use one or more image-based sensors to detect a position of the optical elements 1220a, 1220b, one or more of the eye detectors can be configured to capture one or more images including both an eye and a portion of an optical element 1220a, 1220b to detect a position of the eye and a position of the optical element. Alternatively, a dedicated eye detector may be provided for detecting an eye of the user and respective image sensor may be provided for tracking the position of the optical element. As discussed previously, image-based tracking of an optical element is one optional possibility for detecting the separation distance of the first and second optical elements.

The one or more eye detectors 1510 each comprise one or more image sensors such as a visible light camera or infra-red (IR) sensor. In some examples, one or more of the eye detectors 1510 may comprise a stereo camera for detecting depth of a detected image feature according to a disparity between a left and right image pair. The one or more eye detectors 1510 are each arranged within the HMD 1200 and fixedly mounted at predetermined positions. Each eye detector therefore comprises an image sensor having a predetermined position with a predetermined field of view arranged to include at least one of the user's eyes when the HMD is worn. The eye detector is thus configured to capture one or more images including the user's eye and to detect a position of one or more features of the eye from the captured image, such as the pupil and/or iris and/or sclera. A position of a detected feature with respect to the predetermined position of the eye detector is thus obtained. By calculating a position of a feature of the first eye with respect to an eye detector and calculating a position of a feature of the second eye with respect to another eye detector (or in some cases the same eye detector may capture an image including both eyes in which case a single eye detector may be used), the relative positions of the two respective features can be detected and used to calculate the user's eye separation. In some examples, the HMD may comprise a plurality of eye detectors each configured to capture one or more images of a same eye and a position of a feature of the user's eye can be detected using detection results from the plurality of eye detectors each having a predetermined position within the HMD. For example, one eye detector may be arranged at a position above the user's eye and another eye detector may be arranged at a position below the user's eyes. Therefore, a plurality of images captured from different viewpoints may be used for detecting a position of a feature of an eye.

In some examples, the HMD 1200 comprises a gaze tracking system comprising a plurality of the eye detectors 1510 each comprising an image sensor for capturing images of the user's eyes and tracking the direction of the user's gaze. The eye detectors 1510 may be arranged as shown in the example in FIG. 6a for detecting the gaze direction of one or both of the user's eyes. For example, detection of a position of the pupil of an eye and a position of a reflection in one or more of the cornea and the pupil may be used for detecting the user's gaze direction.

In embodiments of the disclosure, the HMD 1200 comprises at least one eye detector 1510 configured to detect features of the user's eyes and to detect a position of the detected features with respect to the eye detector 1510. Each eye detector 1510, using any suitable eye detection algorithm, can detect one or more features of an eye in a captured image and detect a position for a detected feature. In some examples, contour extraction may be used to firstly detect an outline of an eye in an image and/or to detect an outline of an iris in the image. Colour segmentation may be used since the sclera region is generally white and surrounds the coloured iris region and the sclera region itself is surrounded by a skin region. In some cases a left-to-right (or right-to-left) scan may be carried out at a vertical image position in a captured image. A detection of a portion of skin-tone, followed by a detection of a portion of white or near-white (corresponding to the sclera), followed by a detection of a coloured portion corresponding to the iris, followed by a relatively darker portion corresponding to the pupil and so on may be used to detect the respective features of the eye. Hence more generally, the detectable features of an eye include the sclera, pupil and iris. In particular, a position corresponding to the centre of the pupil can be detected by detecting the left and right boundary of the pupil with the iris (in other words detecting the right extent and the left extent of the pupil) and taking the mid-point. Whilst detecting the centre of the pupil using the extent of the pupil (rather than another feature of the eye) can provide an accurate IPD for the user, the IPD may instead be detected using another feature. For example, the detecting the centre of the pupil may comprise detecting the left and right boundary of the sclera with the skin-tone and taking the mid-point and/or detecting the left and right boundary of the iris with the sclera and taking the mid-point (in some cases, two or more mid-point values may be averaged to obtain the position of the centre of the pupil). This processing can be repeated for both eyes to detect the centre of the respective pupils to thereby detect the user's interpupillary distance (IPD). In some examples, a position of a left (or right) boundary of the iris and the pupil may be detected for the first eye and a position of a left (or right) boundary of the iris and the pupil may be detected for the second eye, and the distance between the two detected positions may be used as the user's detected eye separation. This provides a quicker technique for detecting the user's eye separation using a distance between a same feature detected for both eyes.

In embodiments of the disclosure, the second input unit 1240 for receiving the user input for adjusting the separation of the optical elements 1220a, 1220b is configured to receive the user input in dependence upon a gaze direction detected by the at least one eye detector 1510. The first image is generated for display by the display unit 1210 to include the one or more indicators indicative of the current separation of the first and second optical elements with respect to the separation of the user's eyes. The user can thus view the first image for guidance of whether to increase or decrease the separation of the first and second optical elements 1220a, 1220b. Whilst viewing the first image, the user's gaze can be tracked by the one or more eye detectors 1510 of the HMD. The second input unit 1240 can receive a user input in dependence upon the detected gaze direction. For example, the first image may comprise a first icon selectable by the user's gaze direction for increasing the separation of the two optical elements, and a second icon selectable by the user's gaze direction for decreasing the separation of the two optical elements. The second input unit 1240 can be configured to receive the user input indicative of a selection of one of the first icon and the second icon by the user. Alternatively or in addition, the at least one eye detector 1510 can be configured to detect a predetermined movement of the gaze direction by the user and the second input unit 1240 is configured to receive the user input in dependence upon the detection of the predetermined movement or predetermined time-dependent pattern of the gaze direction. A predetermined movement of the gaze direction, such as an anticlockwise or clockwise movement of the gaze direction, or a left-to-right saccade (or right-to-left saccade) can be performed by the user and detected to allow the user to instruct the HMD 1200 to adjust the separation of the first and second optical elements 1220a, 1220b. In this way, the user can view the first image for guidance and provide a gaze-based user input for the adjustment unit 1250 to adjust the separation of the first and second optical elements 1220a, 1220b.

In embodiments of the disclosure, the second input unit 1240 for receiving the user input from the user comprises a microphone configured to receive the user input. The second input unit 1240 may comprise a microphone provided within the HMD to detect one or more spoken words. The user can therefore view the first image to understand the relationship of the current separation of the first and second optical elements with respect to the indicated eye separation for the user and provide a user input in the form of speech to adjust the separation of the first and second optical elements. Any known speech recognition algorithm may be used and a first word can be associated with a first instruction to increase the separation of the optical elements and a second word, different from the first word, can be associated with a second instruction to decrease the separation of the optical elements. The user can therefore provide a speech input to adjust the separation whilst viewing the first image that is updated according to the changes in the current separation.

Figure 16:
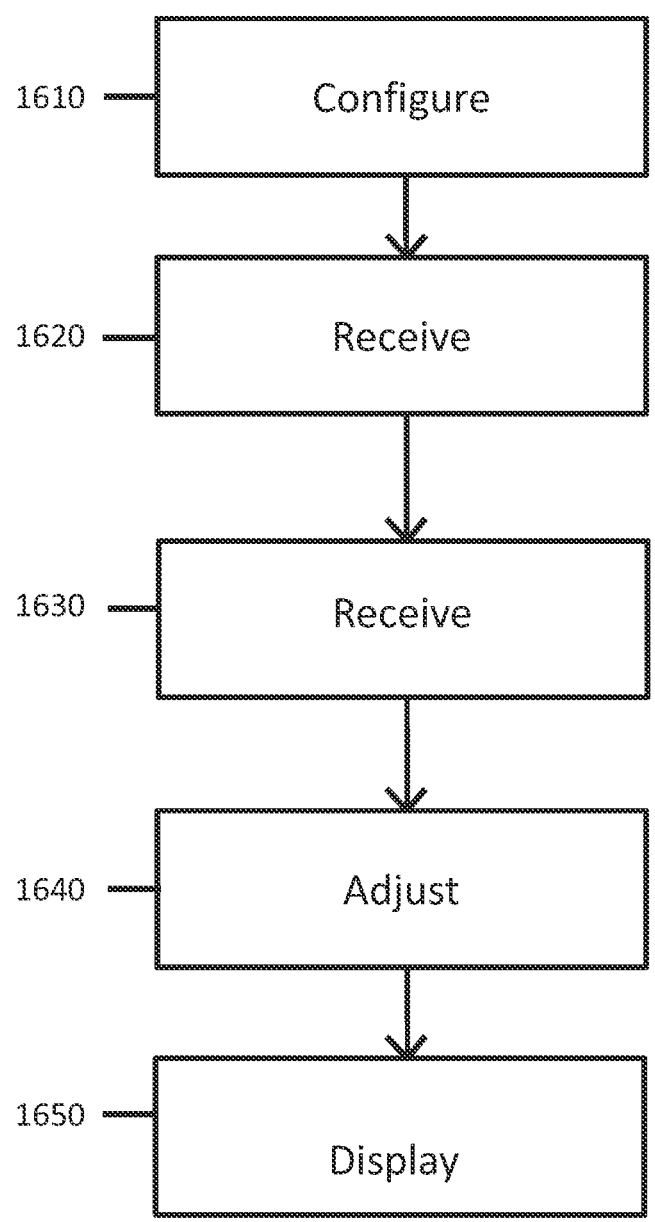
FIG. 16 is a schematic flowchart illustrating a data processing method.

Referring now to FIG. 16, in embodiments of the disclosure a method of configuring an HMD for a user comprises:
configuring (at a step 1610) a first optical element and a second optical element of a head mountable display (HMD) to each direct light from one or more images displayed by a display unit for viewing by a respective eye of the user wearing the HMD;
receiving (at a step 1620) user information for the user indicative of a separation of the user's eyes;
receiving (at a step 1630) a user input;
adjusting (at a step 1640) a current separation of the first and second optical elements responsive to the user input; and
displaying (at a step 1650) a first image comprising one or more indicators indicating the current separation of the first and second optical elements with respect to the separation of the user's eyes.

In one example, an HMD apparatus comprises: the display unit 1210 to display one or more images to a user wearing the HMD; the first optical element 1220a and the second optical element 1220b each configured to direct light from the one or more images displayed by the display unit 1210 for viewing by a respective eye of the user, at least one eye detector 1510 to detect a separation of the user's eyes, and the adjustment unit 1250 to adjust the current separation of the first and second optical elements responsive to the separation of the user's eyes detected by the at least one eye detector 1510. In this example, the HMD apparatus is configured to automatically adjust the separation of the first and second optical elements 1220a, 1220b without receiving a user input from the user. The HMD apparatus is configured to adjust the separation of the first and second optical elements 1220a, 1220b responsive to a value of the eye separation detected by the at least one eye detector 1510 for the user wearing the HMD. The value of the eye separation may be detected by the at least one eye detector 1510 as part of an initial setup procedure. In particular, the adjustment unit 1250 comprises control circuitry and one or more electric motors controlled by the control circuitry (see the previous discussion regarding electric motors of the adjustment unit 1250). The control circuitry is configured to receive information indicative of the user's detected eye separation and to adjust the current separation distance of the first and second optical elements in dependence upon the received information so that the current separation distance substantially corresponds to the detected eye separation. In this way, the optics of the HMD can be automatically configured for the user's detected vision requirements using an automated procedure.

In some cases, a confirmation image may be presented to the user for the user to confirm whether the adjusted configuration is acceptable. In the case where the user indicates that the adjusted configuration is not acceptable, the HMD may subsequently display the first image (such as the first image 1400 in FIG. 14), as discussed previously, so as to allow the user to provide the user input via the second user input 1240 and to provide the user with guidance during the adjustment procedure. Hence optionally alternatively or in addition the HMD may automatically adjust the HMD to an estimated setting, before inviting the user to manually refine the adjustment in a hybrid approach.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A head mountable display (HMD) apparatus, comprising:
a display unit to display one or more images to a user wearing the HMD;
a first optical element and a second optical element each configured to direct light from the one or more images displayed by the display unit for viewing by a respective eye of the user;

a first input unit to receive user information for the user indicative of a separation of the user's eyes;

a second input unit to receive a user input; and an adjustment unit to adjust a current separation of the first and second optical elements responsive to the user input, wherein the display unit is configured to display a first image comprising one or more indicators indicative of the current separation of the first and second optical elements with respect to the separation of the user's eyes.

2. The HMD apparatus according to claim 1, wherein the first image is updated responsive to the adjustment of the current separation of the first and second optical elements.

3. The HMD apparatus according to claim 1, wherein the first image comprises at least one indicator indicative of whether a difference between the current separation of the first and second optical elements and the separation of the user's eyes is greater than a threshold distance.

4. The HMD apparatus according to claim 1, wherein the first image comprises at least one indicator indicative of whether the current separation of the first and second optical elements is greater or smaller than the separation of the user's eyes.

5. The HMD apparatus according to claim 1, wherein the first image comprises at least one indicator indicative of a magnitude of a difference between the current separation of the first and second optical elements and the separation of the user's eyes.

6. The HMD apparatus according to claim 5, wherein the magnitude of the difference between the current separation of the first and second optical elements and the separation of the user's eyes is indicated in predetermined units associated with the second input unit.

7. The HMD apparatus according to claim 6, wherein the second input unit comprises a rotatable unit coupled to the adjustment unit and the magnitude of the difference between the current separation of the first and second optical elements and the separation of the user's eyes is indicated in units of rotation of the rotatable unit.

8. The HMD apparatus according to claim 1, comprising at least one eye detector configured to detect the separation of the user's eyes and to generate the user information for the user.

9. The HMD apparatus according to claim 8, wherein the at least one eye detector is configured to detect features of the user's eyes and to detect a position of the detected features with respect to the eye detector.

10. The HMD apparatus according to claim 9, wherein the detected features comprise the pupils of the user's right eye and left eye.

11. The HMD apparatus according to claim 1, wherein the second input unit comprises a microphone configured to receive the user input.

12. The HMD apparatus according to claim 8, wherein the second input unit is configured to receive the user information in dependence upon a gaze direction detected by the at least one eye detector.

13. A head mountable display (HMD) system, comprising:

a head mountable display apparatus, comprising:

a display unit to display one or more images to a user wearing the HMD;

a first optical element and a second optical element each configured to direct light from the one or more images displayed by the display unit for viewing by a respective eye of the user;

a first input unit to receive user information for the user indicative of a separation of the user's eyes:

a second input unit to receive a user input; and an adjustment unit to adjust a current separation of the first and second optical elements responsive to the user input, wherein the display unit is configured to display a first image comprising one or more indicators indicative of the current separation of the first and second optical elements with respect to the separation of the user's eyes; and an image processor to generate the one or more images for display by the display unit, wherein the image processor is configured to generate the one or more images in dependence upon the user information for the user indicative of the separation of the user's eyes.

14. A method comprising:

configuring a first optical element and a second optical element of a head mountable display (HMD) to each direct light from one or more images displayed by a display unit for viewing by a respective eye of a user wearing the HMD;

receiving user information for the user indicative of a separation of the user's eyes;

receiving a user input;

adjusting a current separation of the first and second optical elements responsive to the user input; and displaying a first image comprising one or more indicators indicating the current separation of the first and second optical elements with respect to the separation of the user's eyes.

15. A non-transitory, computer readable storage medium containing computer software which, when executed by a computer, causes the computer to carry out a method comprising:

configuring a first optical element and a second optical element of a head mountable display (HMD) to each direct light from one or more images displayed by a display unit for viewing by a respective eye of a user wearing the HMD;

receiving user information for the user indicative of a separation of the user's eyes;

receiving a user input;

adjusting a current separation of the first and second optical elements responsive to the user input; and displaying a first image comprising one or more indicators indicating the current separation of the first and second optical elements with respect to the separation of the user's eyes.

* * * * *

UNITED STATES PATENT AND TRADEMARK OFFICE
CERTIFICATE OF CORRECTION

| | | |
|---|---|---|
| PATENT NO. | : 12,393,027 B2 | Page 1 of 1 |
| APPLICATION NO. | : 17/721008 | |
| DATED | : August 19, 2025 | |
| INVENTOR(S) | : Mark Jacobus Breugelmans and Maurizio Cerrato | |

It is certified that error appears in the above-identified patent and that said Letters Patent is hereby corrected as shown below:

In the Claims

In Claim 13, Column 30, Line 9: Delete "eyes:" and insert --eyes;--.

Signed and Sealed this
Sixth Day of January, 2026

John A. Squires
*Director of the United States Patent and Trademark Office*